United States Patent
Gilbert

(10) Patent No.: US 9,930,967 B2
(45) Date of Patent: Apr. 3, 2018

(54) COLLAPSIBLE SELF-SUPPORTING CANOPY

(71) Applicant: Lorenzo Gilbert, Pembroke Pines, FL (US)

(72) Inventor: Lorenzo Gilbert, Pembroke Pines, FL (US)

(73) Assignee: Lorenzo Gilbert, Pembroke Pines, FL (US)

( * ) Notice: Subject to any disclaimer, the term of this patent is extended or adjusted under 35 U.S.C. 154(b) by 0 days.

(21) Appl. No.: 15/239,780

(22) Filed: Aug. 17, 2016

(65) Prior Publication Data

US 2017/0049238 A1  Feb. 23, 2017

Related U.S. Application Data

(60) Provisional application No. 62/205,848, filed on Aug. 17, 2015.

(51) Int. Cl.
| | |
|---|---|
| *A47C 7/66* | (2006.01) |
| *A61G 5/10* | (2006.01) |
| *E04H 15/02* | (2006.01) |
| *B60N 2/48* | (2006.01) |
| *E04H 15/38* | (2006.01) |

(52) U.S. Cl.
CPC ............... *A47C 7/66* (2013.01); *A61G 5/10* (2013.01); *E04H 15/02* (2013.01); *B60N 2/48* (2013.01); *E04H 15/38* (2013.01)

(58) Field of Classification Search
CPC .. A47C 7/66; A61G 5/10; E04H 15/48; E04H 15/02; E04H 15/001
See application file for complete search history.

(56) References Cited

U.S. PATENT DOCUMENTS

| | | | | |
|---|---|---|---|---|
| 4,093,305 A | * | 6/1978 | Staroste | A45B 23/00 297/184.17 |
| 4,915,120 A | * | 4/1990 | Ziolkowski | A47C 7/66 135/117 |
| 4,978,166 A | * | 12/1990 | James | A47D 15/00 297/184.13 |
| 5,056,533 A | * | 10/1991 | Solano | A47D 15/006 128/876 |

(Continued)

FOREIGN PATENT DOCUMENTS

KR  101415935 B1 * 7/2014

*Primary Examiner* — David R Dunn
*Assistant Examiner* — Danielle Jackson
(74) *Attorney, Agent, or Firm* — Kali Law Group, P.C.

(57) ABSTRACT

Collapsible self-supporting canopy are presented including: two U-shaped bows pivotally coupled by a pair of locking hinges, each locking hinge positioned along outward ends of each of the U-shaped bows; a first panel supported by the U-shaped bows, the first panel extending beyond the shaped bows, where the first panel includes a cutout that defines a pivot point; a flexible panel support for supporting a second panel coupled with the first panel; a back edge U-shaped bow for supporting a third panel, the third panel coupled with the second panel and a portion of the first panel; a back panel removably coupled with the third panel, the back panel including at least a circular head support adjustably coupled thereto; and a front panel removably coupled with the first panel, the front panel including a neck cutout defining a substantially circular opening.

15 Claims, 3 Drawing Sheets

(56) References Cited

U.S. PATENT DOCUMENTS

| | | | | |
|---|---|---|---|---|
| 5,320,405 | A * | 6/1994 | Foster | A47C 7/66 135/133 |
| 5,511,259 | A * | 4/1996 | Tarara | A47C 7/66 135/133 |
| 5,921,258 | A * | 7/1999 | Francois | A47C 7/66 135/117 |
| 6,764,133 | B2 * | 7/2004 | Osato | A47D 13/102 297/184.13 |
| 7,118,173 | B2 * | 10/2006 | Kassai | B62B 9/14 135/133 |
| 7,861,735 | B2 * | 1/2011 | Stepaniuk | A61G 5/10 135/66 |
| 7,963,596 | B2 * | 6/2011 | Efthimiou | A47C 7/66 297/184.1 |
| 8,287,038 | B2 * | 10/2012 | Henderson | B62B 9/142 280/47.38 |
| 8,464,379 | B1 * | 6/2013 | Zajac | A61G 1/04 5/113 |
| 9,072,290 | B1 * | 7/2015 | McCauley | A01M 31/025 |
| 2004/0131801 | A1 * | 7/2004 | Wong | A01K 1/033 428/12 |
| 2007/0080519 | A1 * | 4/2007 | Murdock | A61G 5/00 280/650 |
| 2009/0179463 | A1 * | 7/2009 | Fargason | A01K 97/01 297/16.2 |
| 2012/0192905 | A1 * | 8/2012 | Boss | A61G 5/10 135/88.03 |
| 2016/0120323 | A1 * | 5/2016 | Rivera | A47C 1/143 297/184.15 |

* cited by examiner

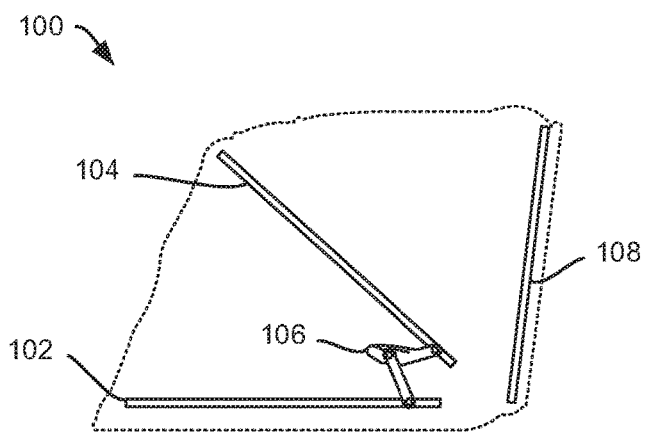
FIG. 1A
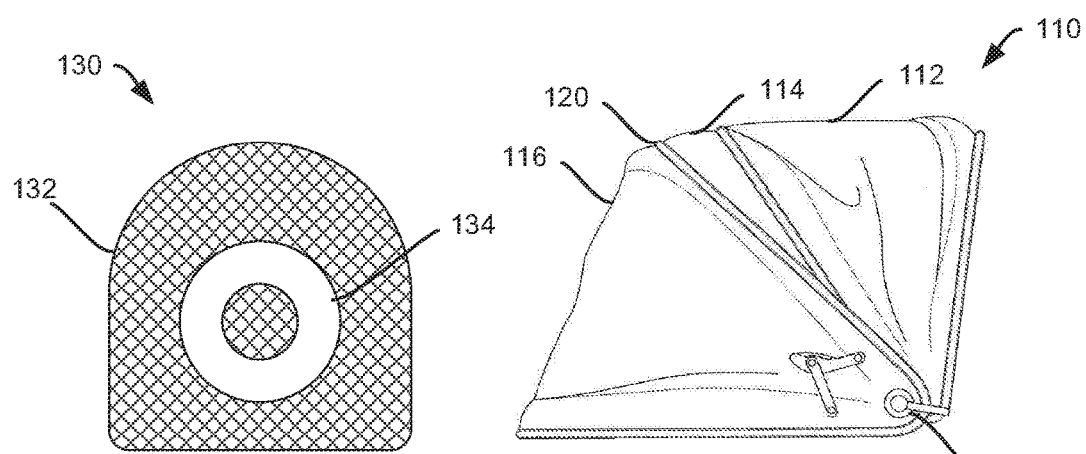
FIG. 1C
FIG. 1B
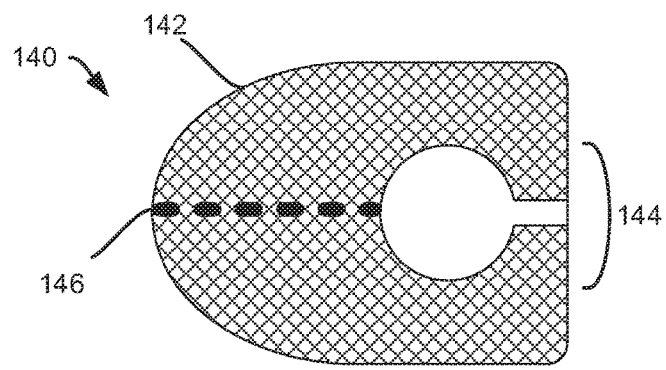
FIG. 1D

COLLAPSIBLE SELF-SUPPORTING CANOPY

BACKGROUND

As daily life becomes more hectic and busy, taking a private moment is becoming increasingly more difficult. For example, when a person is resting or trying sleep in a vehicle, they may be disturbed by a passerby or by exterior light conditions. Tinted windows may provide some privacy, but laws limit how dark glass may be tinted and thus, the windows may not provide sufficient blocking from outside distractions. Attempts may be made to cover windows with blankets, but these attempts not only require several blankets that may be difficult to attach, but may also lead to stuffy and uncomfortable in-vehicle conditions. Finally, although eye masks are commonly used during air travel, many users may experience claustrophobic reactions which may raise anxiety significantly.

As such, collapsible self-supporting canopies are presented herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, collapsible self-supporting canopy are presented including: two U-shaped bows pivotally coupled by a pair of locking hinges, each locking hinge positioned along outward ends of each of the U-shaped bows; a first panel supported by the U-shaped bows, the first panel extending beyond the shaped bows, where the first panel includes a cutout that defines a pivot point; a flexible panel support for supporting a second panel coupled with the first panel; a back edge U-shaped bow for supporting a third panel, the third panel coupled with the second panel and a portion of the first panel; a back panel removably coupled with the third panel, the back panel including at least a circular head support adjustably coupled thereto; and a front panel removably coupled with the first panel, the front panel including a neck cutout defining a substantially circular opening. In some embodiments, the second panel, the back panel, and the front panel are manufactured from a material selected from the group consisting of: a light opaque material, a light semi-opaque material, a light transparent material, and a mesh material. In some embodiments, canopies further include an attachment element for mechanically coupling the collapsible self-supporting canopy with a rigid structure. In some embodiments, the rigid structure is selected from the group consisting of: an automobile seat, a portable chair, a patio lounge chair, and an airplane seat. In some embodiments, the a flexible panel support includes a piping structure. In some embodiments, the circular head support includes a foam donut having a fabric covering, where the fabric covering includes a hook fabric located along a bottom surface of the foam donut such that the foam donut is adjustably coupled with the back panel. In some embodiments, the front panel further includes a closable entry slit extending from the neck cutout to a forward edge of the front panel. Some embodiments further include a removable canopy extension panel, the removable canopy extension panel including a breathable fabric.

In other embodiments, methods for utilizing a collapsible self-supporting canopy are presented including: providing the collapsible self-supporting canopy, the collapsible self-supporting canopy including, at least two U-shaped bows pivotally coupled by a pair of locking hinges, each locking hinge positioned along outward ends of each of the at least two U-shaped bows, a first panel supported by the at least two U-shaped bows, the first panel extending beyond the at least two shaped bows, where the first panel includes a cutout that defines a pivot point, a flexible panel support for supporting a second panel, the second panel coupled with the first panel, a back edge U-shaped bow for supporting a third panel, the third panel coupled with the second panel and a portion of the first panel, a back panel removably coupled with the third panel, the back panel including at least a circular head support adjustably coupled thereto, and attaching the collapsible self-supporting canopy to a rigid structure using an attachment element; adjusting the circular head support to accommodate a user fitment preference; and deploying the self-supporting collapsible canopy.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 1A to 1D are illustrative representations of a self-supporting collapsible canopy in accordance with embodiments of the present invention;

DETAILED DESCRIPTION

Figure 4:
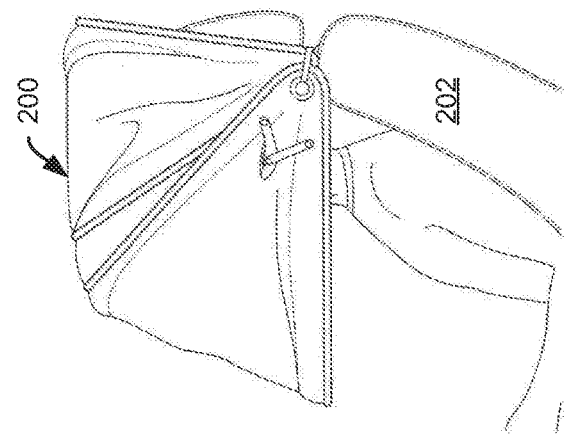
FIG. 4 is an illustrative representation of a self-supporting collapsible canopy in use in accordance with embodiments of the present invention.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Embodiments provided herein may be constructed to fit in, on, or around a chair and or headrest of a chair. Embodiments may be deployed to cover all or a portion of a user's head while sitting in the chair. Embodiments may be adjusted to expand or retract in accordance with a user's desired deployment. Some embodiments may be coupled with a cloth, sheet, or similar material extension used in the industry. The cloth extension may be utilized to extend the collapsible self-supporting canopy to cover all or a portion of a user while sitting in a chair. Further, the cloth extension may be further coupled with a support, pole, rod, bar or similar material used in the industry that will allow the cloth extension to remain where it is placed. In some embodiments, the support structure may also be utilized to help stow the cloth extension and collapsible self-supporting canopy when not in use.

FIGS. 1A to 1D are illustrative representations of a self-supporting collapsible canopy in accordance with embodiments of the present invention. In particular, FIG. 1A is an illustrative representation 100 of a support structure of a self-supporting collapsible canopy in accordance with embodiments of the present invention. The illustrated dotted line represents the covering as contemplated herein and is presented to demonstrate the relationship between structural elements. As illustrated, self-supporting collapsible canopy embodiments include two U-shaped bows 102 and 104 that may be pivotally coupled by locking hinge 106. Locking hinge 106 may be mechanically coupled with U-shaped bows in any manner known in the art without limitation. In addition, back edge U-shaped bow 108 provides support along a back edge of embodiments illustrated. Referring to FIG. 1B, which is an illustrative representation 110 of a support structure of a self-supporting collapsible canopy in accordance with embodiments of the present invention, embodiments include at least three panels 112, 114, and 116. As may be seen, panel 116 maybe supported by U-shaped bows 102 and 104 and may extend beyond the outward ends of those U-shaped bows. Further, panel 116 includes cutout 118 that defines a pivot point for the U-shaped bows and which cutout may be utilized in combination with an attachment element.

Further illustrated, panel 114 may be coupled with panel 112 and supported by flexible panel support 120. In some embodiments, panel 114 may be manufactured from a material such as, a light opaque material, a light semi-opaque material, a light transparent material, and a mesh material. It may be appreciated that selection of a material may provide more or less light intrusion or ventilation as desired by a user. In addition, panel 114 may include attachment points so that various materials may be utilized in combination. For example, a mesh material may be removably covered by a light opaque material in some embodiments. In embodiments, flexible panel supports may be a piping structure, which structure is well-known in the art. Still further illustrated, panel 116 may be coupled with panel 114 and a portion of panel 112. This panel may be supported by back edge U-shaped bow 108. In general, panels 112 and 116 may be manufactured from a light opaque breathable fabric in embodiments.

Referring to FIG. 1C, which is an illustrative representation 130 of back panel 132 of a self-supporting collapsible canopy in accordance with embodiments of the present invention, embodiments include circular head support 134 for centering the back panel on a user's head. In this manner, the structure may be secured relative to the user. In embodiments, the circular head support may include a foam donut with fabric covering. In embodiments, back panel 132 may be removably coupled with panel 112. In some embodiments, the fabric covering includes a hook fabric located along a bottom surface of the circular head support so that the circular head support may be adjustably coupled with the back panel. It may be appreciated that back panel 132 may be manufactured from a variety of materials such as, a light opaque material, a light semi-opaque material, a light transparent material, and a mesh material.

Referring to FIG. 1D, which is an illustrative representation 140 of front panel 142 of a self-supporting collapsible canopy in accordance with embodiments of the present invention, embodiments include neck cutout 144 that defines a substantially circular opening. In embodiments, front panel 142 may be removably coupled with panel 116. Front panels may be utilized to further limit light intrusion for a user using embodiments disclosed herein. Neck cutout 144 may provide a snug comfortable fit. In addition, in some embodiments, front panels may include closable entry slit 146 extending from neck cutout 144 to a forward edge of the front panel 142. It may be appreciated that front panel 142 may be manufactured from a variety of materials such as, a light opaque material, a light semi-opaque material, a light transparent material, and a mesh material.

Figure 3:
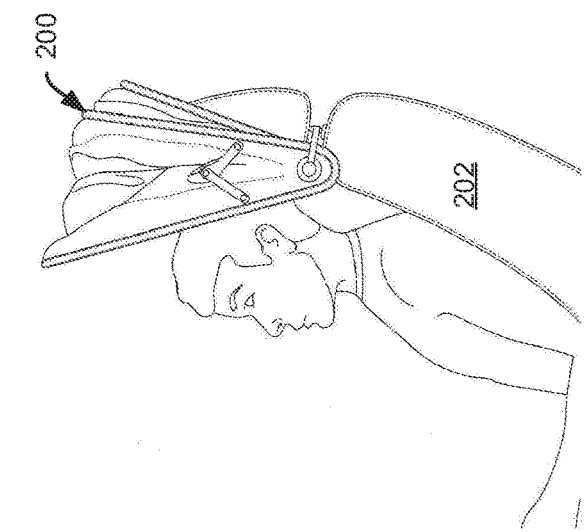
FIG. 3 is an illustrative representation of a self-supporting collapsible canopy in use in accordance with embodiments of the present invention.
Figure 2:
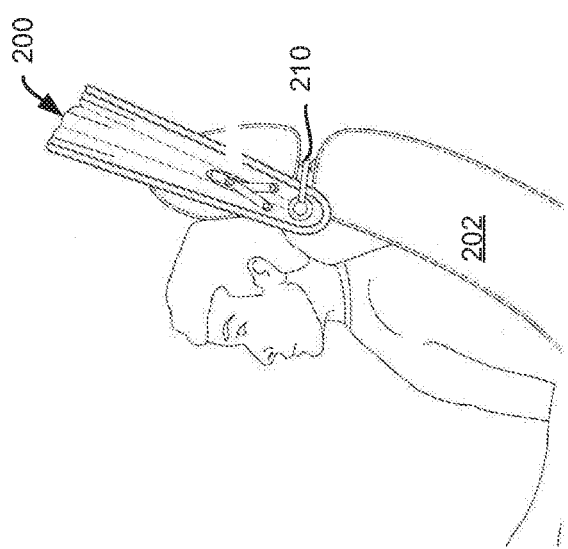
FIG. 2 is an illustrative representation of a self-supporting collapsible canopy in use in accordance with embodiments of the present invention.

FIGS. 2 to 4 are illustrative representations of a self-supporting collapsible canopy in use in accordance with embodiments of the present invention. As illustrated, self-supporting collapsible canopy 200 may be coupled with seat 202. In embodiments, seats may include without limitation an automobile seat, a portable chair, a patio lounge chair, and an airplane seat. Coupling may be accomplished using attachment element 210. Attachment elements may include any clamping mechanism or any strapping mechanism known in the art without limitation. In some embodiments, self-supporting collapsible canopies may be coupled with any rigid structure. As may be seen, FIG. 2 illustrates self-supporting collapsible canopy 200 in a fully collapsed position; FIG. 3 illustrates self-supporting collapsible canopy 200 in a partially deployed position; and FIG. 4 illustrates self-supporting collapsible canopy 200 in a fully deployed position.

In use, methods for using embodiments herein may include at least the following steps:

providing a self-supporting collapsible canopy;

attaching the self-supporting collapsible canopy with a seat or rigid structure;

adjusting the circular head support to accommodate a user preference;

deploying the self-supporting collapsible canopy; and attaching the front panel.

In some embodiments, methods further include attaching a removable canopy extension panel, which panel is discussed in further detail below for FIG. 5. In embodiments, methods further include collapsing the self-supporting collapsible canopy.

Figure 5:
FIG. 5 is an illustrative representation of a self-supporting collapsible canopy in combination with a removable canopy extension panel in accordance with embodiments of the present invention.

FIG. 5 is an illustrative representation 500 of self-supporting collapsible canopy 502 in combination with removable canopy extension panel 504 in accordance with embodiments of the present invention. It may be appreciated that more privacy or less light intrusion may be desirable in some conditions. Embodiments disclosed herein may provide additional features when utilized in combination. As such, a removable canopy extension panel manufactured from a breathable fabric may be utilized. Removable canopy extension panel embodiments may include any number of attachment points and elements such as, for example, suction cups, hook and loop fabric, magnets, clips, clamps, hooks, and the like without limitation. In addition, removable canopy extension panels may be manufactured from a material such as: a light opaque material, a light semi-opaque material, a light transparent material, and a mesh material.

Alternate Embodiments

In some embodiments, self-supporting collapsible canopies may include a fan or other ventilation device. In fully covering a user's head, the user may experience stuffiness or feelings of claustrophobia. In this example, a fan or ventilating device may provide additional comfort for a user. In still other embodiments, a water delivery system coupled with a fan or ventilating device may provide passive cooling. In this example, the water delivery system may lightly spray or mist self-supporting collapsible canopies and removable canopy extension panel with water. The fan or ventilation device may then move air across the fabric panels to create a cooling effect caused by evaporation of the water. This example embodiment may be especially desirable in hot dry climates.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A collapsible self-supporting canopy comprising:
   at least two U-shaped bows pivotally coupled by a pair of locking hinges, each locking hinge positioned along outward ends of each of the at least two U-shaped bows;
   a first panel supported by the at least two U-shaped bows, the first panel extending beyond the at least two shaped bows, wherein the first panel includes a cutout that defines a pivot point, wherein the pivot point is positioned beyond ends of the at least two U-shaped bows;
   a flexible panel support for supporting a second panel, the second panel coupled with the first panel;
   a back edge U-shaped bow for supporting a third panel, the third panel coupled with the second panel and a portion of the first panel;
   a back panel removably coupled with the third panel, the back panel including at least a circular head support adjustably coupled thereto; and
   a front panel removably coupled with the first panel, the front panel including a neck cutout defining a substantially circular opening.

2. The collapsible self-supporting canopy of claim 1, wherein the second panel, the back panel, and the front panel are manufactured from a material selected from the group consisting of: a light opaque material, a light semi-opaque material, a light transparent material, and a mesh material.

3. The collapsible self-supporting canopy of claim 1, further comprising:
   an attachment element for mechanically coupling the collapsible self-supporting canopy with a rigid structure.

4. The collapsible self-supporting canopy of claim 3, wherein the rigid structure is selected from the group consisting of: an automobile seat, a portable chair, a patio lounge chair, and an airplane seat.

5. The collapsible self-supporting canopy of claim 1, wherein the a flexible panel support comprises a piping structure.

6. The collapsible self-supporting canopy of claim 1, wherein the circular head support comprises a foam donut having a fabric covering, wherein the fabric covering includes a hook fabric located along a bottom surface of the foam donut such that the foam donut is adjustably coupled with the back panel.

7. The collapsible self-supporting canopy of claim 1, wherein the front panel further comprises a closable entry slit extending from the neck cutout to a forward edge of the front panel.

8. The collapsible self-supporting canopy of claim 1, further comprising a removable canopy extension panel, the removable canopy extension panel comprising a breathable fabric.

9. A method for utilizing a collapsible self-supporting canopy comprising:
   providing the collapsible self-supporting canopy, the collapsible self-supporting canopy including,
      at least two U-shaped bows pivotally coupled by a pair of locking hinges, each locking hinge positioned along outward ends of each of the at least two U-shaped bows,
      a first panel supported by the at least two U-shaped bows, the first panel extending beyond the at least two shaped bows, wherein the first panel includes a cutout that defines a pivot point, wherein the pivot point is positioned beyond ends of the at least two U-shaped bows;
      a flexible panel support for supporting a second panel, the second panel coupled with the first panel;
      a back edge U-shaped bow for supporting a third panel, the third panel coupled with the second panel and a portion of the first panel,
      a back panel removably coupled with the third panel, the back panel including at least a circular head support adjustably coupled thereto, and
   attaching the collapsible self-supporting canopy to a rigid structure using an attachment element;
   adjusting the circular head support to accommodate a user fitment preference; and
   deploying the self-supporting collapsible canopy.

10. The method of claim 9, further comprising:
   attaching a front panel, the front panel removably coupled with the first panel, the front panel including a neck cutout defining a substantially circular opening.

11. The method of claim 9, further comprising:
attaching a removable canopy extension panel, the removable canopy extension panel comprising a breathable fabric.

12. The method of claim 9, further comprising:
collapsing the self-supporting collapsible canopy.

13. The method of claim 9, wherein the rigid structure is selected from the group consisting of: an automobile seat, a portable chair, a patio lounge chair, and an airplane seat.

14. The method of claim 9, wherein the circular head support comprises a foam donut having a fabric covering, wherein the fabric covering includes a hook fabric located along a bottom surface of the foam donut such that the foam donut is adjustably coupled with the back panel.

15. The method of claim 9, wherein the front panel further comprises a closable entry slit extending from the neck cutout to a forward edge of the front panel.

* * * * *